United States Patent [19]
Chang et al.

[11] Patent Number: 5,602,563
[45] Date of Patent: Feb. 11, 1997

[54] FLOAT TO SURFACE DISPLAY

[75] Inventors: David Y. Chang; Shih-Gong Li, both of Austin, Tex.

[73] Assignee: International Business Machines Corporation, Armonk, N.Y.

[21] Appl. No.: 168,545

[22] Filed: Dec. 15, 1993

[51] Int. Cl.$^6$ .................................................. G09G 5/00
[52] U.S. Cl. ........................................... 345/115; 345/145
[58] Field of Search ................................... 345/146, 145, 345/902, 156, 157, 115, 160, 56

[56] References Cited

U.S. PATENT DOCUMENTS

| | | |
|---|---|---|
| 4,646,081 | 2/1987 | Tsunoda . |
| 4,789,962 | 12/1988 | Berry et al. . |
| 5,186,629 | 2/1993 | Rohen ..................................... 345/163 |

FOREIGN PATENT DOCUMENTS

0185904A1  2/1986  European Pat. Off. .

OTHER PUBLICATIONS

IBM Technical Disclosure Bulletin, vol. 28, No. 9 Feb. 1986 Hardware Control of Display Screen Windowing.
"Microsoft Works For Windows" User's Guide Version 2.0 1991, pp. 96, 115, 123.

Primary Examiner—Richard Hjerpe
Assistant Examiner—Regina Liang
Attorney, Agent, or Firm—Jeffrey S. LaBaw

[57] ABSTRACT

A method, system and program for displaying data in a panel with output fields which are insufficiently long to display some data. A panel with data in a plurality of output fields is displayed, in one preferred embodiment, the data is displayed in matrix form. A first data displayed in a truncated manner in a first output field insufficiently long to fully display the first data. If the first output field is selected, a first location on the display is determined at which a first floating output field sufficiently long to display the first data will not overlap any significant feature of the panel and the first floating output field is displayed at this location. An indicia is displayed in any output field to indicate that the data is displayed therein in a truncated manner. If subsequent output fields are selected containing truncated data, their floating output fields are located so that they do not overlap any previous floating output field. If subsequent locations can not be identified, the previous output fields can be repositioned. Alternatively, a permissible distance between a truncated output field and its floating output field can be increased.

5 Claims, 11 Drawing Sheets

| NODE ID | TRAFFIC COUNTS | | | | | | | |
|---|---|---|---|---|---|---|---|---|
| 101 | 35 | 46 | 312 | 49 | 510 | 67 | 89 | 112 |
| 109 | 341 | 1234 | 45 | 92 | 813 | 25 | 9 | 245 |
| 119 | 9 | 6 | 78 | 34 | 21 | 63 | 49 | 52 |
| 125 | 1345 | 732 | 2131 | 456 | 913→ | 928→ | 759→ | 3 |
| 133 | 27 | 14 | 546 | 1345 | 100→ | 312→ | 109→ | 45 |
| 141 | 987 | 982 | 9342 | 5987 | 3961 | 4583 | 1245 | 36 |
| 149 | 48 | 9913 | 976 | 8541 | 3678 | 5419 | 4932 | 187 |
| 157 | 41 | 37 | 5991 | 6789 | 4523 | 6714 | 432 | 18 |

| NODE ID | TRAFFIC COUNTS | | | | | | | |
|---|---|---|---|---|---|---|---|---|
| 101 | 35 | 46 | 312 | 49 | 510 | 67 | 89 | 112 |
| 109 | 341 | 1234 | 45 | 92 | 813 | 25 | 9 | 245 |
| 119 | 9 | 6 | 78 | 34 | 21 | 63 | 49 | 52 |
| 125 | 1345 | 732 | 2131 | 456 | 913→ | 928→ | 759→ | 3 |
| 133 | 27 | 14 | 546 | 1345 | 100→ | 312→ | 109→ | 45 |
| 141 | 987 | 982 | 9342 | 5987 | 3961 | 4583 | 1245 | 36 |
| 149 | 48 | 9913 | 976 | 8541 | 3678 | 5419 | 4932 | 187 |
| 157 | 41 | 37 | 5991 | 6789 | 4523 | 6714 | 432 | 18 |

FLOAT TO SURFACE DISPLAY

DESCRIPTION

BACKGROUND OF THE INVENTION

This invention relates generally to a user interface of a data processing system. More particularly, the invention concerns displaying data in a output fields within a panel of graphical user interface.

It is well known to provide a Graphical User Interface (GUI) to allow user to control computer system and to present their results of system operations on the display. The computer system will display information useful to the user, however, the limited display space available will not allow the system to provide all of the useful information on a single display screen. The user will generally be forced to navigate to further user interface panels to see all of the pertinent information about a particular subject. One example is a user interface designed to cover status information for a massively large computer network. A matrix, in which a plurality of cells presents a summary of status information for corresponding group of nodes, is a useful format for such graphical user interface. The size of the cells in the matrix should be designed so that it is usually sufficient to display the status data of a major portion of the nodes in the group, yet allow all of the nodes to be presented on a single display panel.

No matter how well the GUI panel has been designed, occasionally the data to be displayed in a particular output field is too long to be fully accommodated. One possible solution would be to reconfigure the matrix to allow the longer data to be fully displayed. However, the screen space may be insufficient for this approach. Also, it may be computationally expensive to continually redesign the matrix whenever the data becomes too long for a particular cell.

The present invention presents a solution which will allow the output fields to remain at a static size, while accommodating data longer than the cell size.

SUMMARY OF THE INVENTION

Therefore it is an object of the invention to view long data when a output field and a static graphical user interface is not sufficient to display the long data.

It is another object of the invention to show a link between the untruncated data and the output field to which it was allocated.

It is another object of the invention to display a plurality of untruncated data from truncated output fields simultaneously.

It is another object of the invention to locate the untruncated long data where a minimum of other important data is overlapped.

These and other objects are accomplished by a method, system and program for displaying data in a panel with insufficiently long output fields. A panel with data in a plurality of output fields is displayed, in one preferred embodiment, the data is displayed in matrix form. At least one piece of data is displayed in a truncated manner in a output field insufficiently long to fully display the data. If the output field is selected, a location on the display is determined at which a corresponding floating output field, sufficiently long to display the long data, will preferably not overlap any significant features in the GUI. The floating output field is displayed at this location. The location should be determined so that the floating output field will not overlap any other output field which is selected or in which data is displayed in a truncated manner. An indicia is displayed in any output field to indicate that the data is displayed therein in a truncated manner.

If a second piece of data displayed in a truncated manner in a second output field is selected, a second location on the display at which a second floating output field sufficiently long to display the second long data will not overlap any other selected field or the first floating output field is determined at which the second floating output field is displayed. A first and a second guideline are displayed to indicate that the first and second floating output fields respectively correspond to the first and second output fields. If the second location can not be determined, the first floating output field is relocated. After relocation of the first floating output field, a location on the display is determined at which a second floating output field sufficiently long to display the second data will not overlap any other selected field or the first floating output field. The second floating output field is displayed at this location.

In another embodiment of the invention, the first and second locations must be within a first distance in a first pass from the first and second output fields respectively. If a second location can not determined, the permissible distance can be increased to a second distance for a second pass. If a special selection of an output field occurs, e.g., double clicking on the output field, a second panel is displayed which contains detailed data concerning the output field.

BRIEF DESCRIPTION OF THE DRAWINGS

This invention will become more easily understood by the following detailed description of a preferred embodiment of the invention with reference to the attached drawings, in which:

FIG. 4 illustrates a matrix GUI illustrating the principles having a first float to surface output field of the present invention monitoring the network of FIG. 3.

FIG. 5 illustrates the matrix GUI having a second output field.

DETAILED DESCRIPTION OF THE DRAWINGS

The invention may be run on a collection of computers under a number of different operating systems. The computers in the network could be, for example, a personal computer, a mini computer, mainframe computer or a computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to Technical Reference Manual Personal Systems/2 Model 50, 60 systems IBM Corporation, Part No. 68X2224 Order Number S68X-2224 and Technical Reference Manual Personal Systems/2 (Model 80) IBM Corporation Part No. 68X 2256 Order Number S68X-2254. One operating system which an IBM PS/2 personal computer may run is IBM's OS/2 2.0 (TM). For more information on the IBM OS/2 2.0 Operating System, the reader is referred to OS/2 2.0 Technical Library, Programming Guide Vol. 1, 2, 3 Version 2.00 Order Nos. 10G6261, 10G6495, 10G6494.

In the alternative, the computer system might be in the IBM RISC System/6000 (TM) line of computers which run on the AIX (TM) operating system. The various models of the RISC System/6000 are described in many publications of the IBM Corporation, for example, RISC System/6000, 7073 and 7016 POWERstation and POWERserver Hardware Technical reference, Order No. SA23-2644-00. The AIX operating system is described in General Concepts and Procedure—AIX Version 3 for RISC Systems/6000 Order No. SC23-2202-00 as well as other publications of the IBM Corporation.

Figure 1:
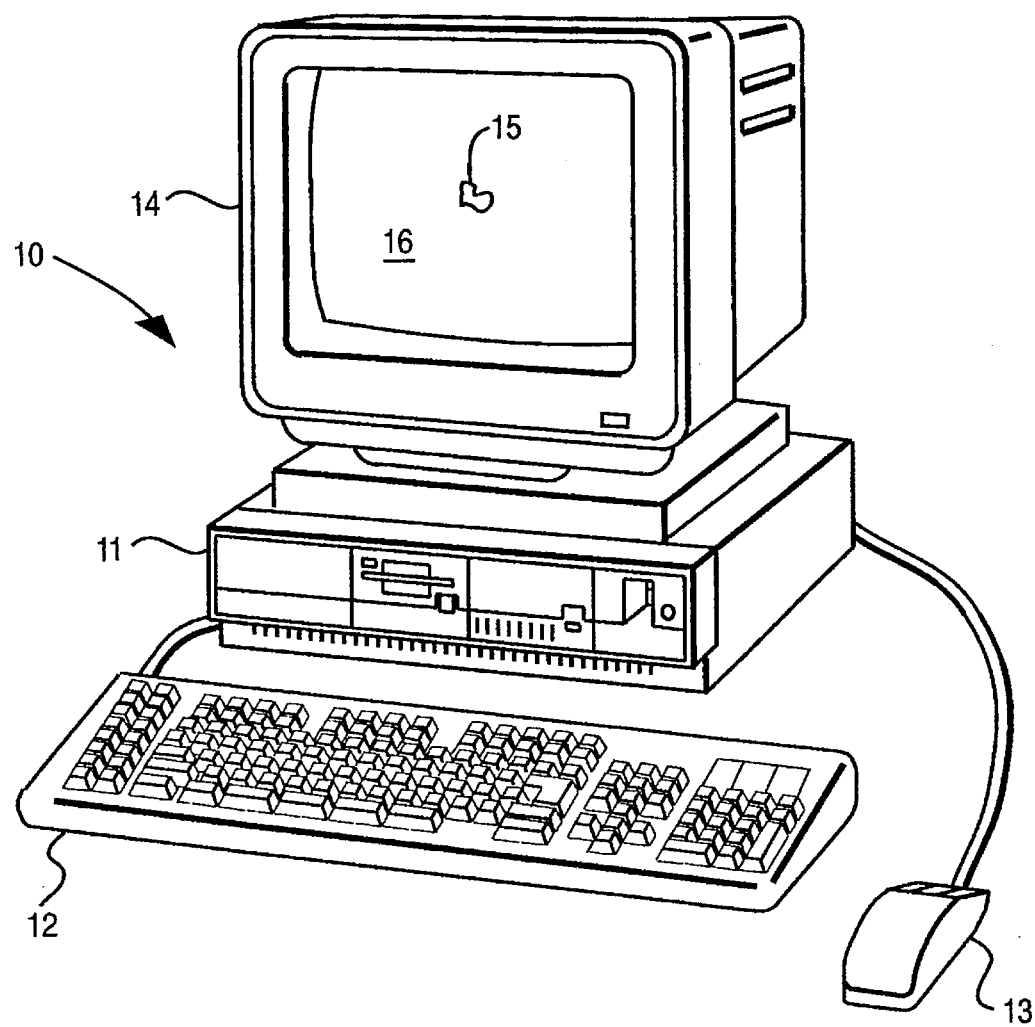
FIG. 1 illustrates a computer comprising a system unit, a keyboard, a mouse and a display.

In FIG. 1, a computer 10, comprising a system unit 11, a keyboard 12, a mouse 13 and a display 14 are depicted. The screen 16 of display device 14 is used to present the graphical user interface (GUI). The graphical user interface supported by the operating system allows the user to use a point and shoot method of input, i.e., by moving the mouse pointer 15 to an icon representing a data object at a particular location on the screen 16 and pressing one of the mouse buttons to perform a user command or selection.

Figure 2:
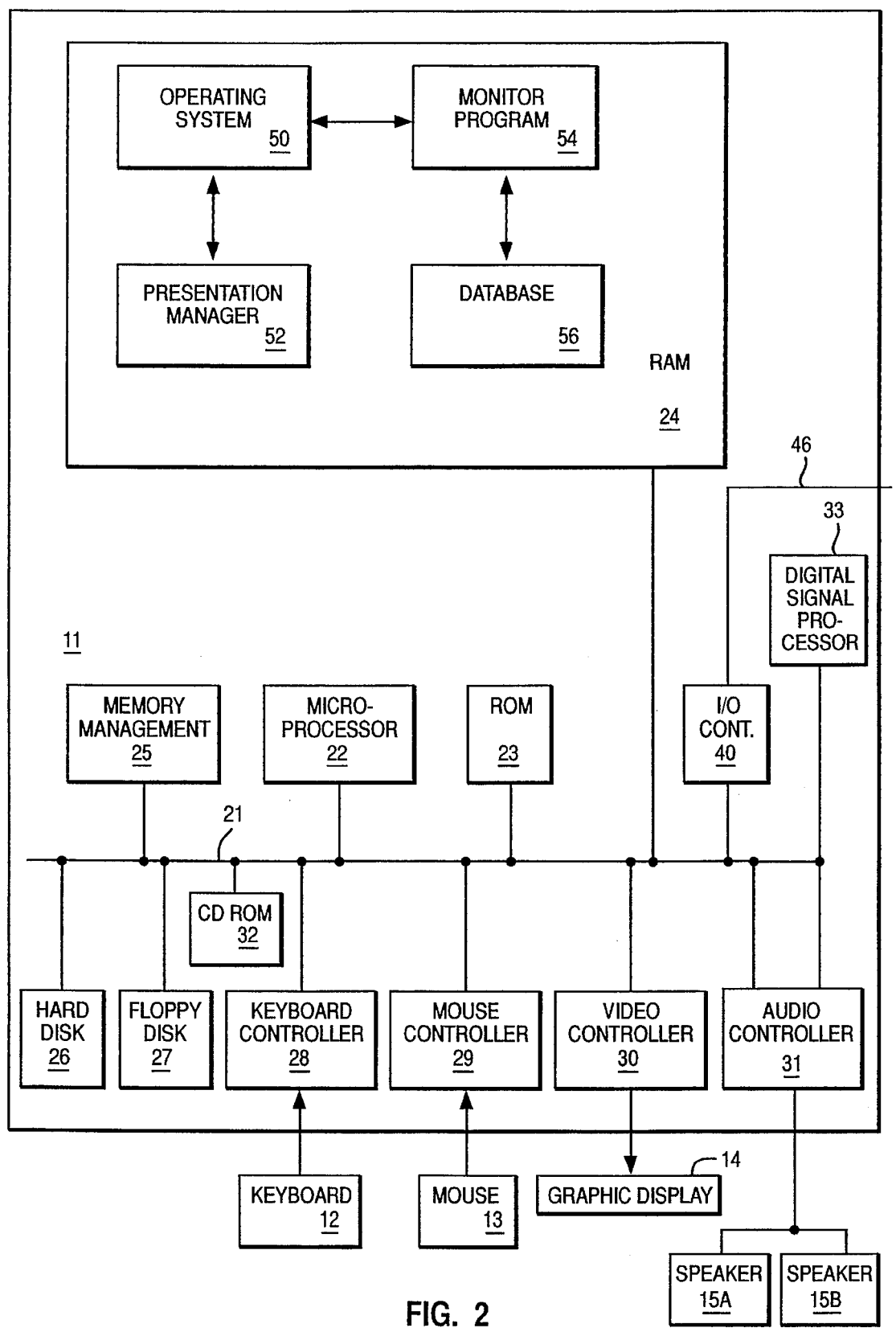
FIG. 2 is an architectural block diagram of the computer illustrated in FIG. 1.

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output system (BIOS) which controls basic hardware operations such as the interaction of the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32, also coupled to the system bus 21, is used to store a large amount of data, e.g., a multimedia program or large database.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 20 is the hardware interface for the display 14, and the audio controller 31 is the hardware interface for the speakers 15a and 15b. The speakers 15a and 15b may be used to present audio objects to the user. An I/O controller 40 such as a Token Ring Adapter enables communication over a network 46 to other similarly configured data processing systems.

One of the preferred implementations of the present invention is as a set of instructions in a code module resident in the random access memory 24. Until required by the computer system, the set of instructions may be stored in another computer memory, for example, in the hard disk drive 26, in an optical disk for eventual use in the CD ROM 32 or in a floppy disk for eventual use in the floppy disk drive 27. As shown in the figure, the operating system 50 and presentation manager 52 are resident in RAM 24. In one preferred embodiment, the invention is embodied as an adjunct module onto the operating system. Alternatively, the graphical user interface could be incorporated into a standalone application, such as the monitor program 54 which monitors the nodes in a computer network, or those nodes in the network which store part of the parallel database 56.

Figure 3:
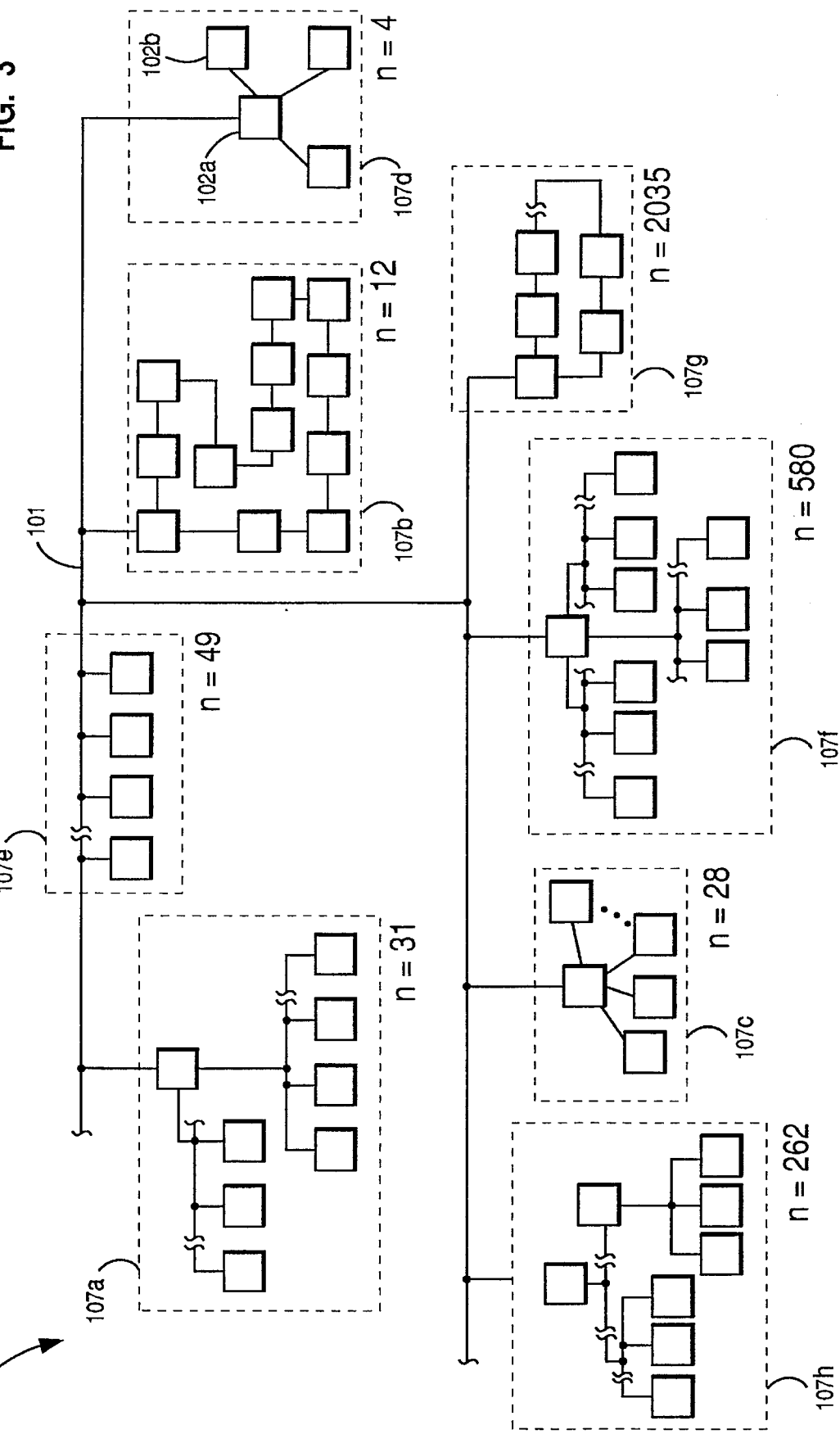
FIG. 3 illustrates a computer network having nodes in groups of various sizes.

In FIG. 3, a computer network is shown with a variety of nodes. The network 100 has a transmission medium 101 over which a variety of devices may communicate. Nodes 102a, 102b, etc. may include devices such as work stations, file servers, cell controllers, bridges, etc., all of which may be connected to the network 100 in groups of various sizes.

In the network depicted in the figure the nodes have been assigned to eight groups 107a through 107h. According to the terminology of the present invention, the size of a group is defined as the number of nodes, n, in the group. In this example, the groups are of widely varying sizes as may be seen in the illustration. However, the groups may alternatively be nearly equal in number.

One graphical user interface in which the invention may be employed is depicted in FIGS. 4–7. The GUI shows traffic count for a plurality of nodes in matrix form. Referring specifically to FIG. 4, the matrix 130 has been laid out in a 8×8 grid wherein each cell within the matrix displays the traffic count for a particular node. The first row of the matrix contains the traffic count for nodes 101 through 108, the second row for nodes 109 through 118, and so forth. Most of the time, the traffic count can be expressed in four digits, and so can be accommodated within the allotted cell size. However, in some cases, for example in cell 131, the traffic count must be expressed in five or more digits, and thus can not be accommodated within the matrix. In the cell 131, a truncation symbol, e.g., a right arrow, is placed within the cell indicating to the user that there is more data than can be displayed within the cell, i.e. the data is truncated. If the user wants further information, he can select that cell and a floating output field 133 will appear. Another term used for the floating output field is a "float to surface display" because of the appearance that the field floats above the matrix.

As shown in FIG. 5, a plurality of floating output fields may be displayed concurrently by the graphical user interface. In addition to selecting the first cell 131, resulting in the first floating output field 133, he has also selected a second cell 135, resulting a second float to surface display 137. To enable the user to easily understand which cell's data the floating output field is displaying, guidelines 138, 140 connect the floating output fields to their respective output fields.

The presentation of the float to surface displays is governed by certain rules in the preferred embodiment. First, each subsequent floating field will be located so as not to overlap with any existing floating field. Second, each floating field will be located so that it will not obscure the matrix. If the matrix is displayed over substantially the entire display space, the floating output fields' locations will be chosen so that the most pertinent features of the matrix such as the highlighted fields, the truncated fields, etc. are still visible. Third, the floating output fields will be located close to the truncated output cell, within a specified distance. Fourth, if it is necessary to relocate the float to surface displays to accomplish the first three objectives, the fewer relocated, the better. Fifth, if the floating output field can not be located according to the first four rules, the distance from the truncated output field can be increased.

Figure 6:
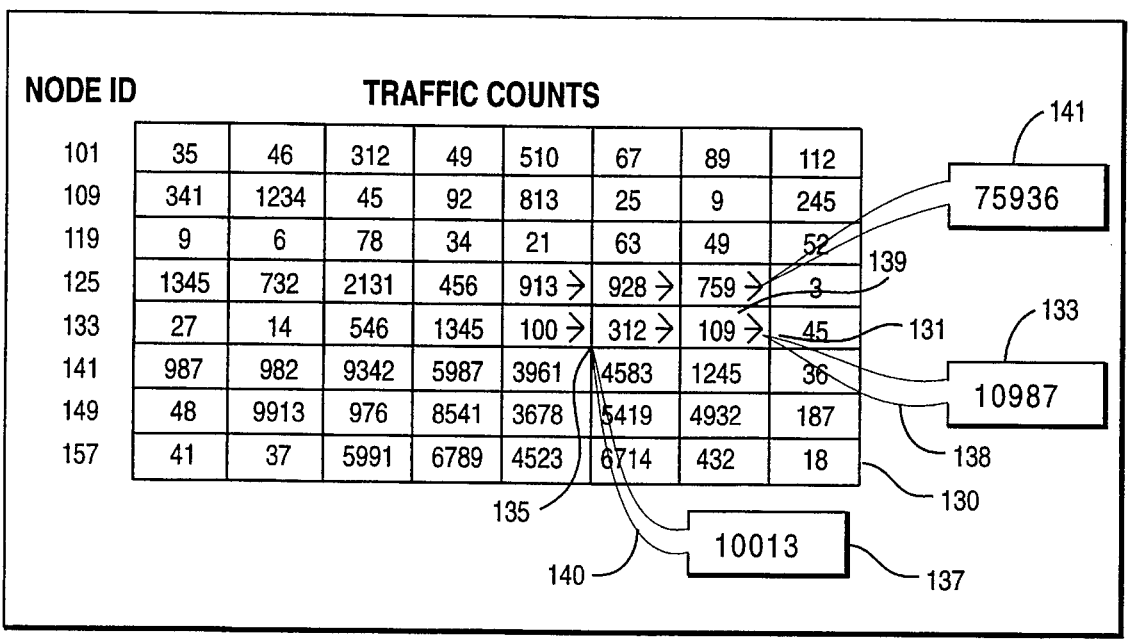
FIG. 6 illustrates the matrix GUI in which the first float to surface output field is relocated to display a third float to surface output field.

The relocation of a preexisting floating output field is depicted in FIG. 6. The user has selected a third truncated output cell 139. This causes the system to relocate the first floating output field 133 to accommodate a third floating output field 141. The GUI in the figure only depicts three floating output fields, 133, 137 and 141 for the sake of clarity. It is likely that the interface would be more crowded to actually necessitate the repositioning of the first floating output field 133.

Figure 7:
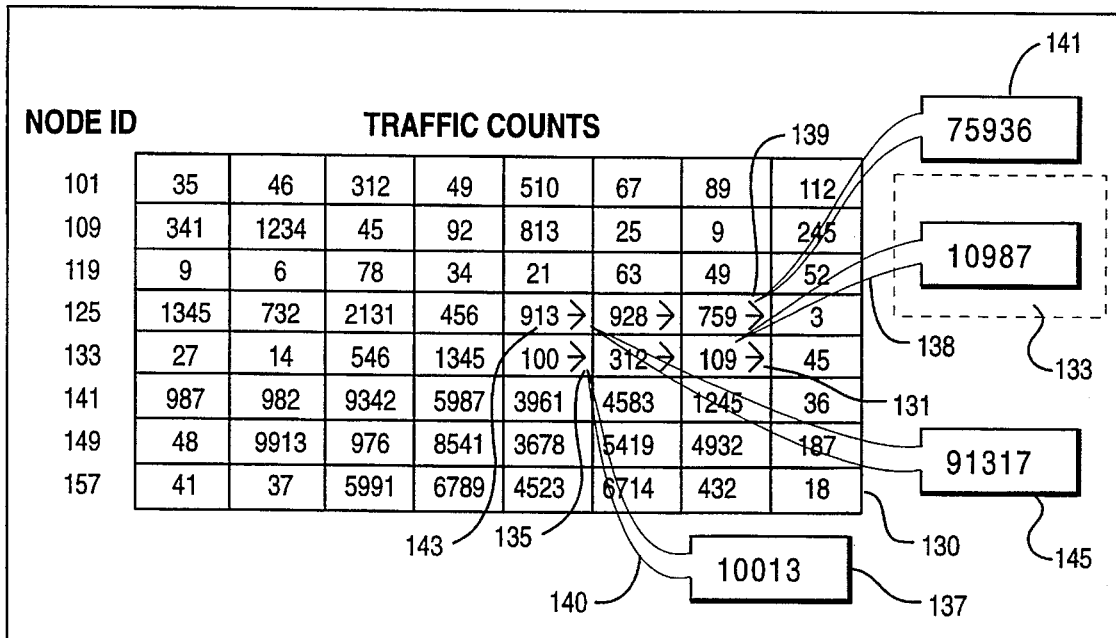
FIG. 7 illustrates the matrix GUI in which the distance between the third output field and its associated matrix cell is increased to permit display.

Increasing the maximum distance allowed between the float to surface display and its corresponding truncated cell is depicted in FIG. 7. As shown, the distance between truncated cell 143 and float to surface display 145 has been increased so as not to obscure the matrix 130 or the preexisting float to surface displays.

The floating output fields are used to display the truncated data from the matrix cell, the information in which the user is most interested. The GUI also has a feature for an alternate selection technique, e.g., a double click instead of a single click on a mouse button, invokes the presentation of a dialog box showing more detailed information about the node associated with the truncated cell. Because the dialog box is substantially larger than the float to surface display, the rules regarding location discussed above are not followed.

Figure 8A:
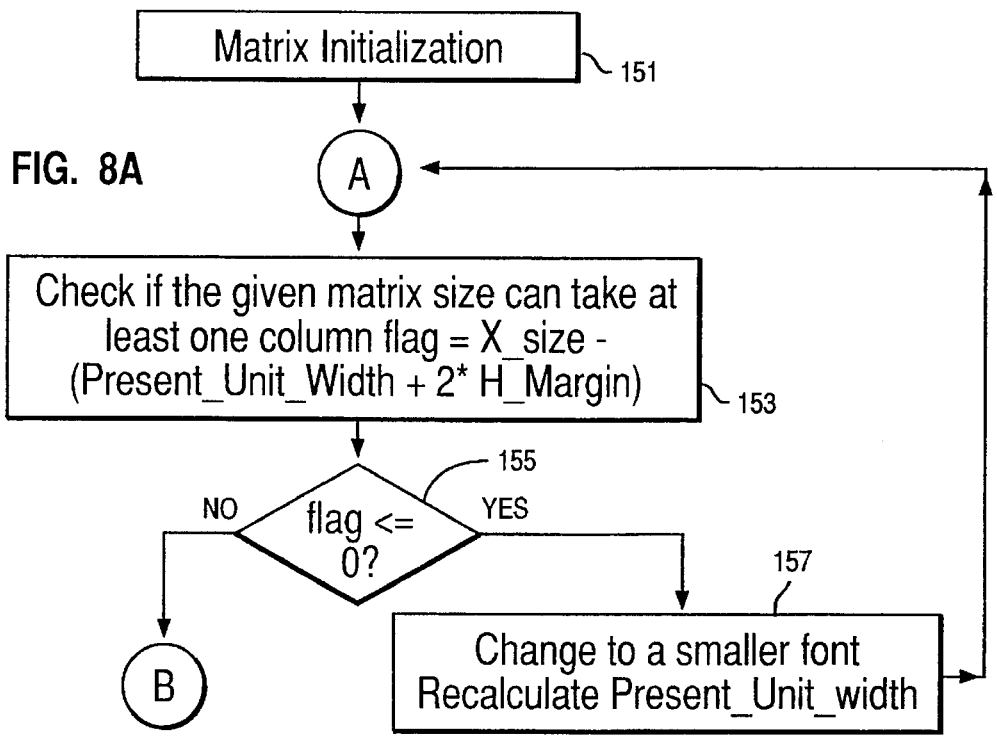
FIG. 8A–8C are flow diagrams of the process to build the initial graphical user interface.
Figure 8B:
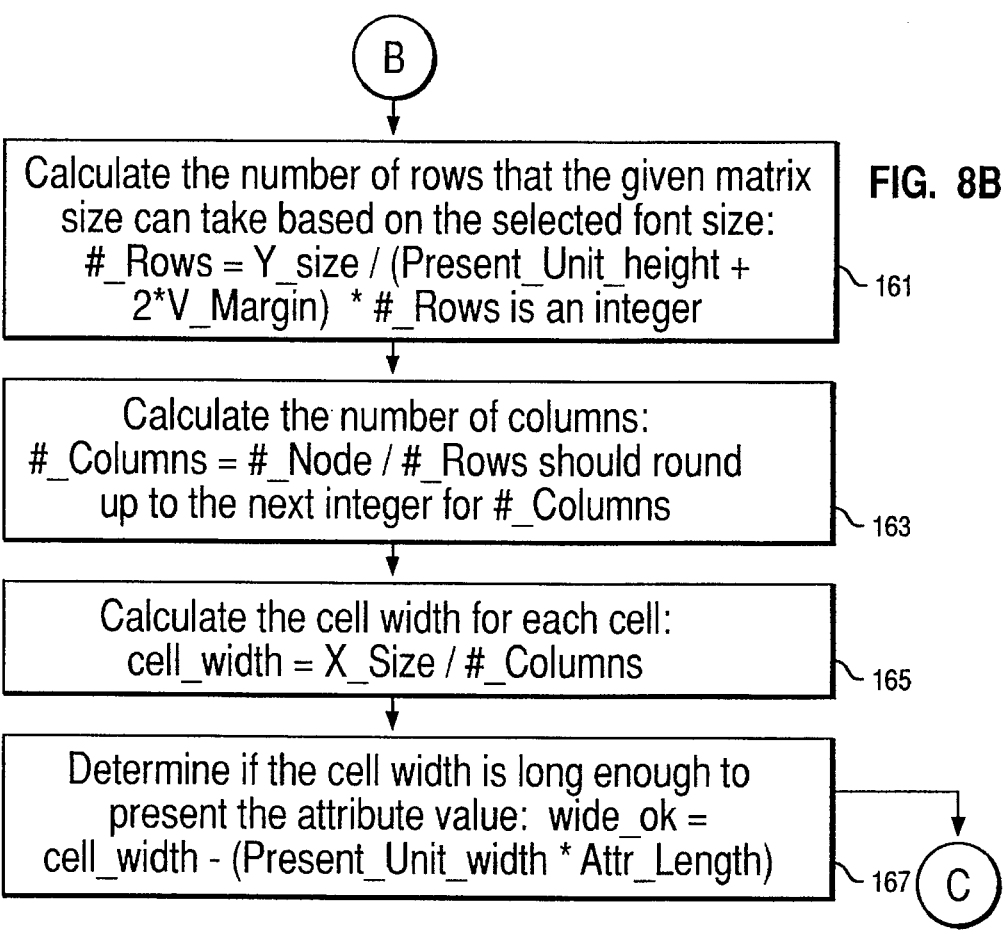
Figure 8C:
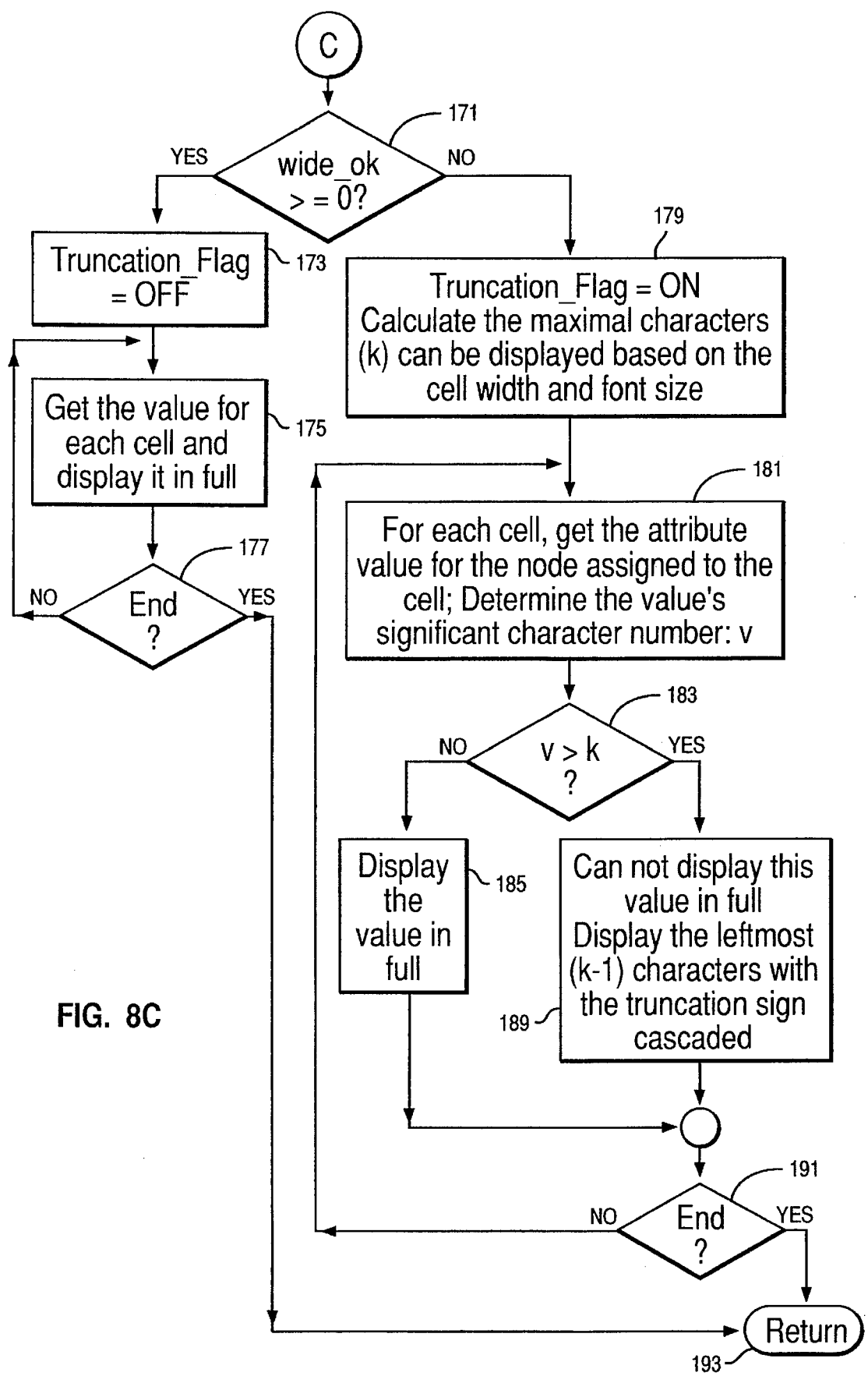

A flow diagram for the initialization of the GUI is presented in FIGS. 8A–8C. The process begins in step 151, when the user invokes matrix initialization. Matrix initialization can be invoked in several different ways, e.g., the user choose a different attribute to be displayed by the GUI, the user changes the size of the window in which the matrix is displayed, the user adds new nodes to the network, or the font is changed for the matrix. The presentation of the matrix is based on a set of presentation parameters such as the current allowed width and height of the matrix, the number of nodes in the matrix, the length of the date of the chosen attribute and the vertical and horizontal distances between two adjacent pieces of data. Other presentation parameters include the height and width of a single character of the selected font and the type of data of the chosen attribute such as integer, floating or ascii.

The process proceeds to step 153 where a flag checking the current matrix size is set to determine whether at least one character can be presented within a cell according to the width of the matrix, the current font and horizontal distance between two adjacent pieces of data. If the result of this calculation is less than or equal to zero, step 155, a smaller font is chosen in step 157.

Proceeding to FIG. 8B, in step 161, the number of rows that the current matrix size can accommodate is calculated according to the height of the current font, the vertical size of the matrix and the vertical distance between two adjacent pieces of data. In step 163, the number of columns is calculated based on the number of nodes divided by the number of rows. The cell width is calculated in step 165 according to the current width of the matrix divided by the number of columns. Then, in step 167, the process determines whether the cell width is long enough to present the attribute for every cell according to the cell width, the width of the font and the length maximum of the attribute value from all the cells.

In step 171 of FIG. 8C, a test is performed to determine whether the data for this particular cell can be presented fully. If so, in step 173, the truncation flag is set to off. The value for each cell is retrieved and displayed in full in step 175. A test in step 177 determines whether the data for all the cells has been presented. If so, the system presents the GUI and returns to other processing, step 193.

If the cell was not large enough to display all the data fully, the data must be displayed in truncated form. In step 179, the truncation flag is set on and the maximum number of characters that can be displayed based on the cell width and the font size is calculated. For each cell, in step 181, the attribute value for the node assigned to the cell is retrieved and the number of characters in that value is determined. In step 183, a test is performed to determine whether the attribute value can be displayed fully. If so, in step 185, the value is displayed in full. If not, in step 189, the left most characters with the addition of the truncation sign is displayed within the cell. A test is performed in step 191 to determine whether all the cells have been displayed. If so, the process ends in step 191.

Figure 9:
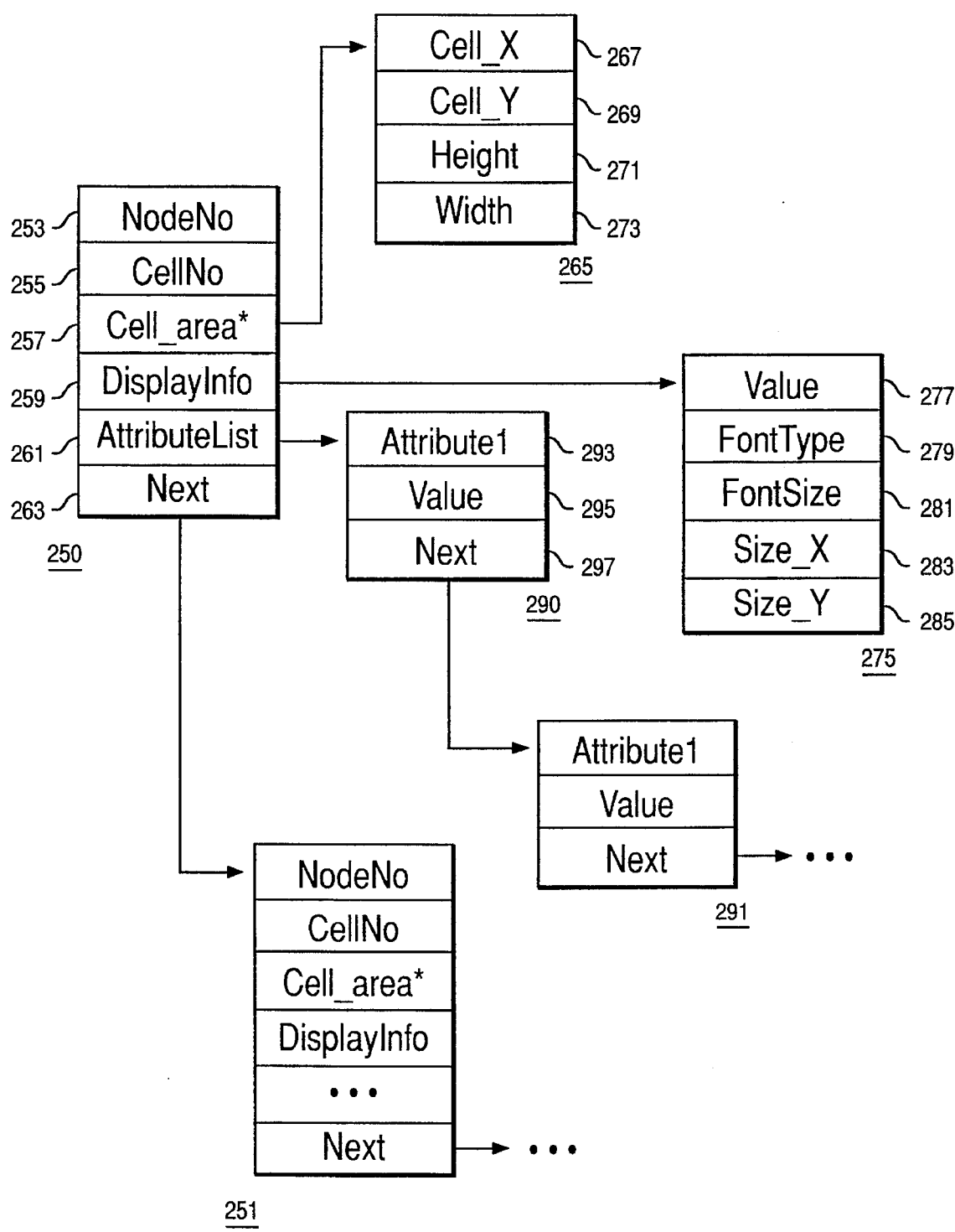
FIG. 9 illustrates one possible data structure of the matrix according to the present invention.

The process depicted in FIGS. 8A–8C depend upon a data structure for storing the required data. The data structure depicted in FIG. 9 is one possible structure stored in memory The data structure could be expanded to contain additional data about each node, however, in the figure only the data which concerns the invention is depicted.

A plurality of node data files 250, 251 correspond to each of the nodes monitored by the status program. Each of the node data files contains fields for the node number 253, the cell number 255, the cell area 257, the display information 259, an attribute list and a pointer to the next node data file. The cell area field may be further subdivided into fields for the x and y coordinate of the cell 267, 269 and the horizontal and vertical dimensions of the cell 271, 273. The display information can be further subdivided into the actual value to be displayed 277, one of the attributes of the node, the font type 279, the font size 281, and the height. The attribute list is a pointer to the first of the attribute data files 290 for the node. It contains data on the name of the first attribute 293, the value of the first attribute 295 and a pointer 297 to the next attribute data field. Only one of the attributes will be displayed in the matrix. However, the data structure contains the values for all the attributes in case the user will want to look at a different attribute, or according to a new feature of the invention, wants a popup dialog box which present the node information in greater detail.

Figure 10:
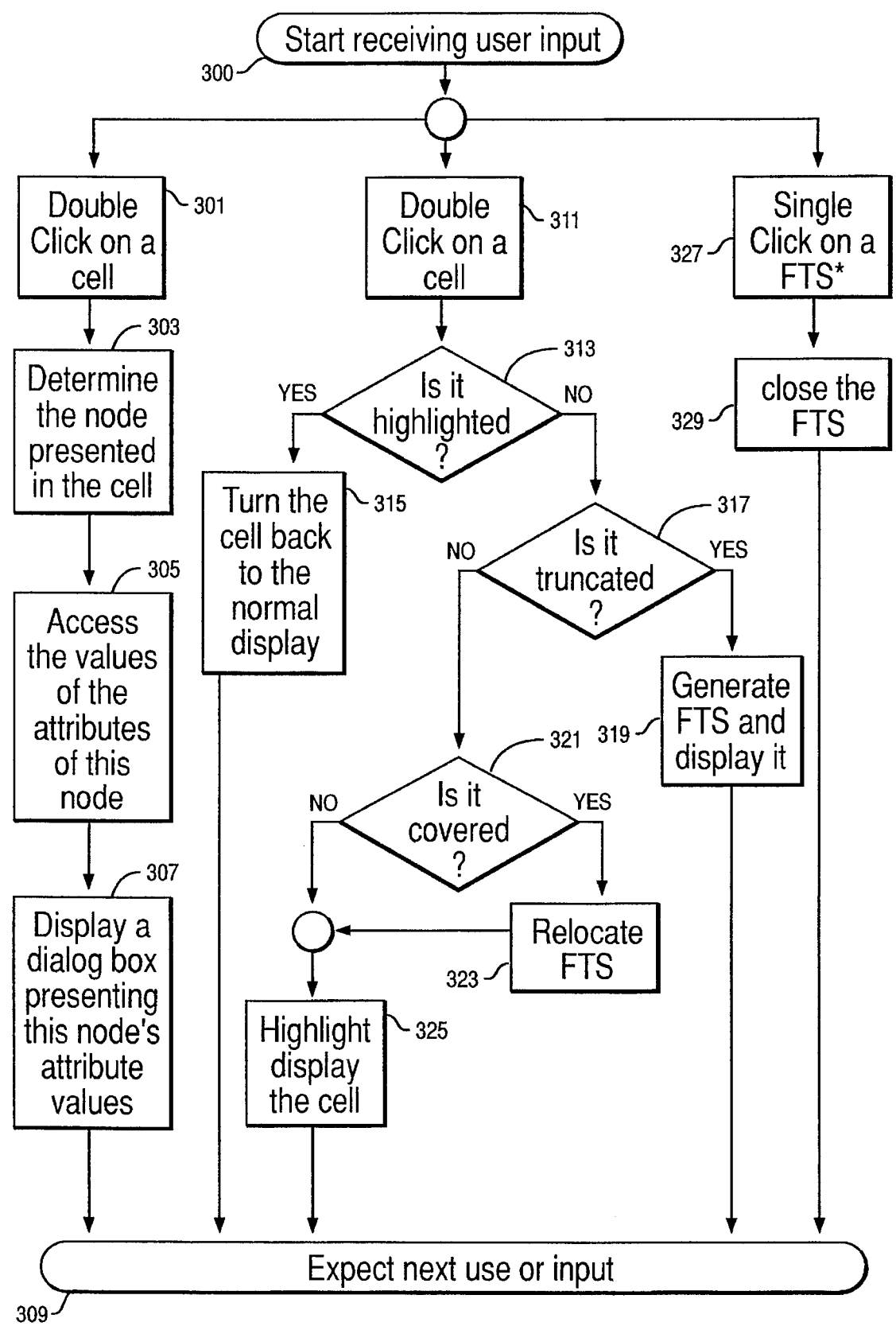
FIG. 10 is a flow diagram for system responses to user actions within the GUI.

The system will react to user input according to the flow diagram depicted in FIG. 10. In step 300, the system starts receiving user input. Depending on the type of user input, the process will flow down one of the three branches.

If the user action is determined to be a double click from a mouse button on a cell in step 301, the node presented in that cell is determined. In step 305, the values of the attributes for the node are retrieved. Finally, in step 307, a dialog box presenting this node's attribute values is shown to the user. The system then waits for further user actions, step 309.

If the user action is a single mouse click on a cell, step 311. In step 313, a test is performed to determine whether the cell is highlighted, indicating previous selection. If it is highlighted, in step 315, the cell is returned to the normal display. If the cell is not highlighted, in step 317, a test is performed to determine whether the data in the cell is truncated. If the data is truncated, in step 319, a float to surface display is generated and displayed in the GUI. If the cell is not truncated, step 321 determines whether is covered by a float to surface display. If so, the covering float to surface display is relocated to uncover the cell, step 323. In step 325, the cell is highlighted. The system waits for further actions by the user, step 309.

If the user action is a single click on a float to surface display, step 327, the system closes and removes the deselected float to surface display from the GUI in step 329. Although the description above discusses user action in terms of mouse button clicks, those skilled in the art would appreciate that user input from other pointing devices or keyboards could be employed by the user to interact with the graphical user interface.

Figure 11:
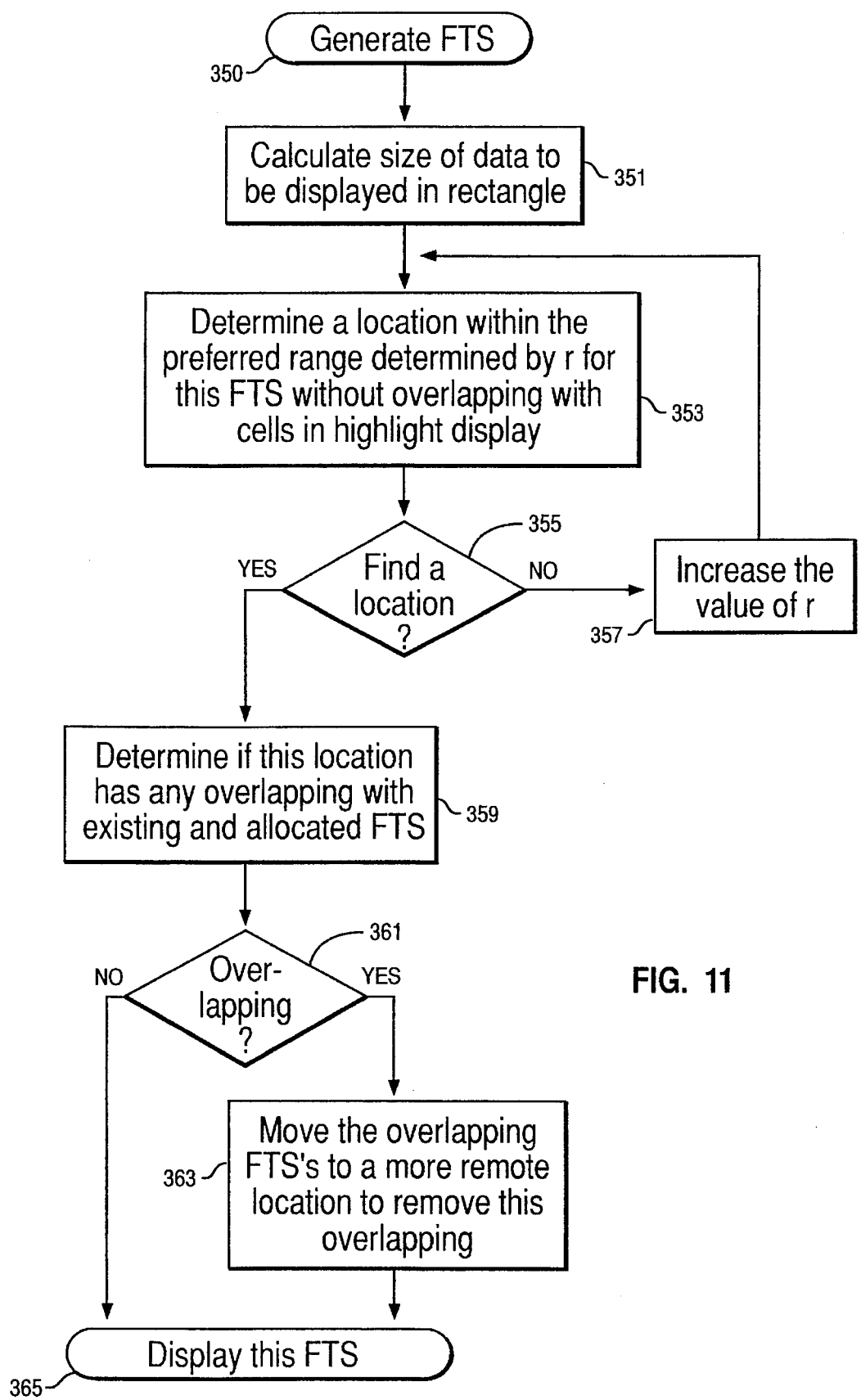
FIG. 11 is a flow diagram for finding a location for a float to surface output field.

The process for generating a floating output field is illustrated in FIG. 11. In step 350, a command to generate the floating output field is received by the system. In step 351, the size of the data to be displayed in the float to surface display is calculated. A location within the specified range from its associated cell is determined without overlapping important features of the matrix such as a highlighted cell in step 353. In step 355, a test is performed to determine whether a suitable location was found. If not, the specified range is increased in step 357.

Once the location passes the test in step 355, the system determines whether the location would overlap with any existing and previously allocated float to surface displays, steps 359 and 361. If so, in step 363, an attempt is made to move some of the overlapping float to surface displays to remove some of the overlapping. If suitable locations for all the float to surface displays are determined, in step 365, the GUI is presented.

Figure 12:
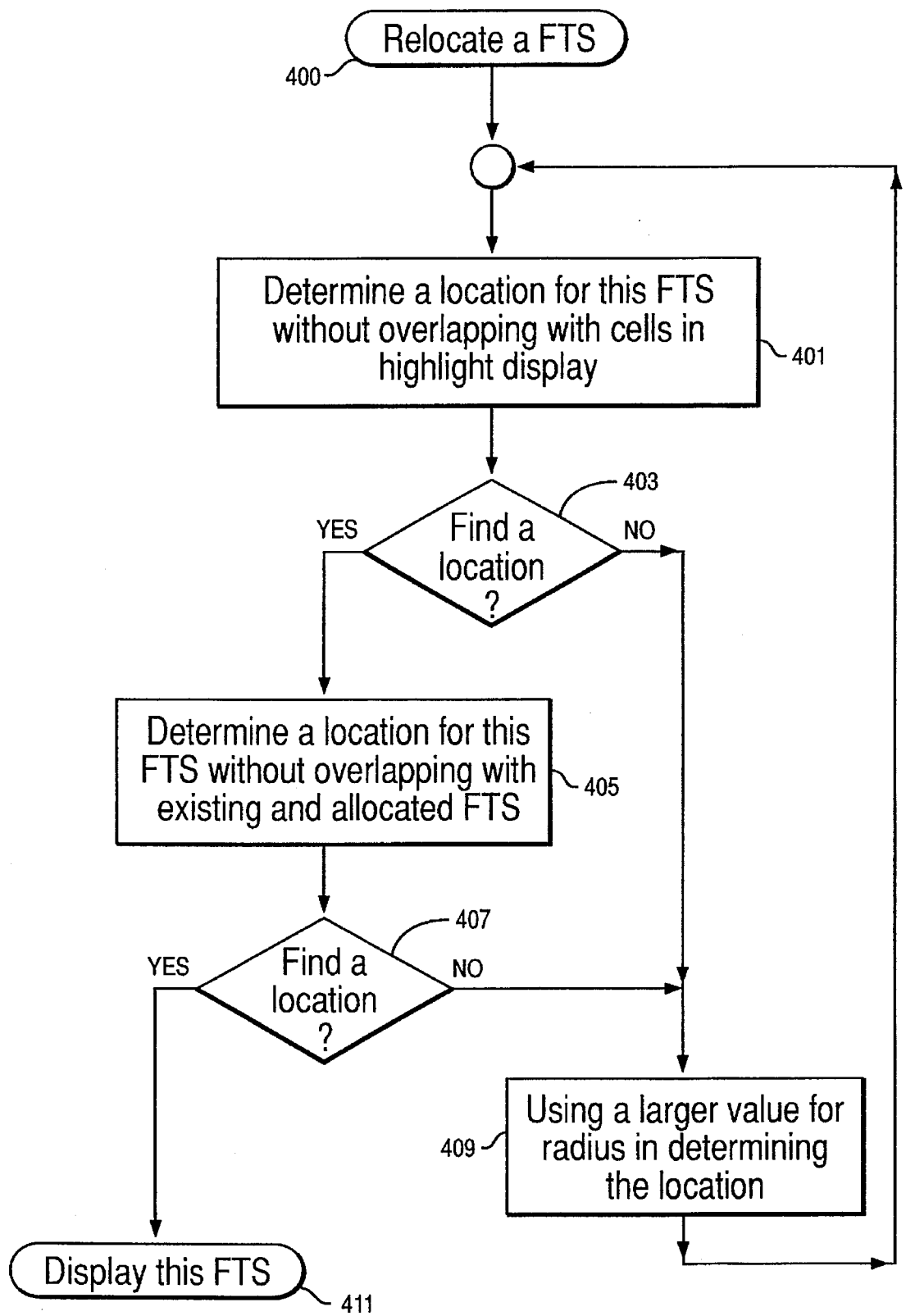
FIG. 12 is a flow diagram for relocating existing float to surface output fields so that a new float to surface output field can be displayed.

The process for relocating a previously allocated float to surface display is discussed with reference to FIG. 12. In step 400, the decision is made to try to relocate a floating output field to enable a later selected floating field to be displayed. In step 401, a location which does not overlap any important features of the matrix is sought. In step 403, a test is performed to determine whether a suitable location was found. If the location passes this test, in steps 405 and 407, the system determines whether the location also avoids overlap with the other existing float to surface displays. If not, in step 409, the specified range is increased, and the search for a suitable location resumes. Once a location for the floating output field is identified, it is displayed in step 411.

While the invention has been described with respect to particular embodiments above it would be understood by those skilled in the art that modifications may be made without departing from the spirit and scope of the present invention. While the illustrations show the floating output fields positioned outside any part of the matrix, the programmer may decide that it is acceptable to place the floating output field over the matrix as long as it does not cover any significant features. Examples of significant features include selected or highlighted cells or cells with truncated information. The panel is not necessarily configured as a matrix. There may be an output field which is related in some way to the field in which the truncated data is displayed. Therefore, the related field would be significant feature and the floating output field would be located so that it does not cover the related field. These embodiments are for purposes of example and illustration only and are not to be taken to limit the scope of the invention narrower than the scope of the appended claims. The invention is intended to be limited only as defined in the claims.

We claim:

1. A method for displaying data in a user interface of a computer system, comprising the steps of:

displaying a panel with data in a plurality of output fields, a first data displayed in a truncated manner in a first output field;

responsive to selection of the first output field, selecting a first location among a first plurality of possible locations on the display at which a first floating output field sufficiently long to display the first data will not overlap any significant feature of the panel;

responsive to selecting the first location, displaying the first floating output field at the first location;

displaying in the panel a second data displayed in a truncated manner in a second output field;

responsive to selection of the second output field, attempting to select a second location among a second plurality of possible locations on the display at which a second floating output field sufficiently long to display the second data will not overlap any significant panel feature or the first floating output field;

responsive to a failure to select the second location, relocating the first floating output field to a third location;

selecting a fourth location among the second plurality of possible locations on the display at which a second floating output field sufficiently long to display the second data will not overlap any other selected field or the first floating output field; and responsive to selecting the fourth location, displaying the second floating output field at the fourth location.

2. A method for displaying data in a user interface of a computer system, comprising the steps of:

displaying a panel with data in a plurality of output fields, a first data displayed in a truncated manner in a first output field;

responsive to selection of the first output field, selecting a first location among a first plurality of possible locations on the display at which a first floating output field sufficiently long to display the first data will not overlap any significant feature of the panel;

responsive to selecting the first location, displaying the first floating output field at the first location;

displaying in the panel a second data displayed in a truncated manner in a second output field;

responsive to selection of the second output field, attempting to select a second location among a second plurality of possible locations on the display at which a second floating output field sufficiently long to display the second data will not overlap any significant panel feature or the first floating output field;

responsive to a failure to select the second location, selecting a third location among a third plurality of possible locations on the display at which a second floating output field sufficiently long to display the second data will not overlap any other selected field or the first floating output field, the third plurality of possible locations at a greater distance from the second output field than the second plurality of possible locations; and responsive to selecting the third location, displaying the second floating output field at the third location.

3. A system for displaying data in a computer user interface, comprising:

means for displaying a panel with data in a plurality of output fields, a first data displayed in a truncated manner in a first output field;

means responsive to selection of the first output field for selecting a first location among a first plurality of possible locations on the display at which a first floating output field sufficiently long to display the first data will not overlap any significant feature in the panel;

responsive to selecting the first location means for displaying the first floating output field at the first location;

means for displaying in the panel a second data displayed in a truncated manner in a second output field;

means responsive to selection of the second output field, for attempting to select a second location among a second plurality of possible locations on the display at which a second floating output field sufficiently long to display the second data will not overlap any significant panel feature or the first floating output field;

means responsive to a failure to select the second location, for relocating the first floating output field to a third location;

means for selecting a fourth location among the second plurality of possible locations on the display at which a second floating output field sufficiently long to display the second data will not overlap any other selected field or the first floating output field; and means responsive to selecting the fourth location for displaying the second floating output field at the fourth location.

4. A system for displaying for displaying data in a computer user interface, comprising:

displaying a panel with data in a plurality of output fields, a first data displayed in a truncated manner in a first output field;

responsive to selection of the first output field for selecting a first location among a first plurality of possible locations on the display at which a first floating output field sufficiently long to display the first data will not overlap any significant feature in the panel;

responsive to selecting the first location, displaying the first floating output field at the first location;

means for displaying in the panel a second data displayed in a truncated manner in a second output field;

means for responsive to selection of the second output field for attempting to determine a second location among a second plurality of possible locations on the display at which a second floating output field sufficiently long to display the second data will not overlap any significant panel feature or the first floating output field;

means responsive to a failure to select the second location for selecting a third location among a third plurality of possible locations on the display at which a second floating output field sufficiently long to display the second data will not overlap any other selected field or the first floating output field, the third plurality of possible locations at a greater distance from the second output field than the second set of possible locations; and responsive to selecting the third location, for displaying the second floating output field at the third location.

5. A computer program product on a computer readable memory for displaying data in a user interface comprising:

means for displaying a panel with data in a plurality of output fields, a first data displayed in a truncated manner in a first output field;

means responsive to selection of the first output field for selecting a first location among a first plurality of possible locations on the display at which a first floating output field sufficiently long to display the first data will not overlap any significant feature of the panel;

means responsive to selecting the first location for displaying the first floating output field at the first location, the means activated when the storage device is connected to and accessed by the data processing system;

means for displaying in the panel a second data displayed in a truncated manner in a second output field;

means responsive to selection of the second output field for attempting to determine a second location among a second plurality of possible locations on the display at which a second floating output field sufficiently long to display the second data will not overlap any significant panel feature or the first floating output field;

means responsive to a failure to select the second location for relocating the first floating output field to a third location;

means for determining a fourth location among the second plurality of possible locations on the display at which a second floating output field sufficiently long to display the second data will not overlap any other selected field or the first floating output field; and means responsive to determining the fourth location for displaying the second floating output field at the fourth location.

\* \* \* \* \*

UNITED STATES PATENT AND TRADEMARK OFFICE
CERTIFICATE OF CORRECTION

PATENT NO. : 5,602,563
DATED : February 11, 1997
INVENTOR(S) : Chang et al

It is certified that error appears in the above-identified patent and that said Letters Patent is hereby corrected as shown below:

Column 3, line 39, please delete "i.e.," and substitute --i.e.--.

Signed and Sealed this

Eighth Day of June, 1999

Attest:

Q. TODD DICKINSON

*Attesting Officer*         *Acting Commissioner of Patents and Trademarks*